Jan. 14, 1964
A. H. WILLINGER
3,117,587
PLASTIC VALVE UNIT
Filed May 19, 1960
2 Sheets-Sheet 1
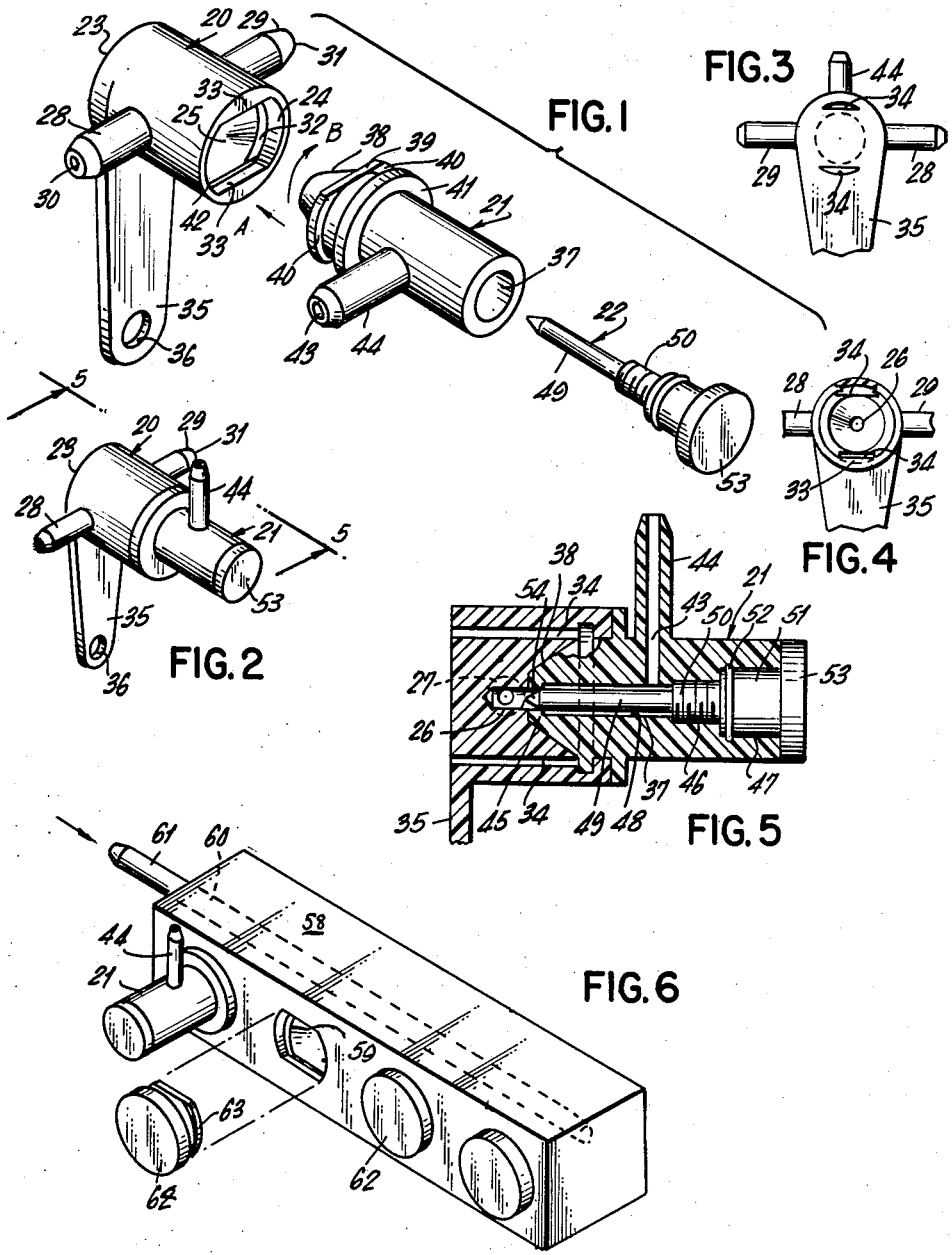
INVENTOR.
ALLAN H. WILLINGER
BY
ATTORNEY Jan. 14, 1964     A. H. WILLINGER     3,117,587
PLASTIC VALVE UNIT Filed May 19, 1960     2 Sheets-Sheet 2

INVENTOR.
ALLAN H. WILLINGER
BY
ATTORNEY

3,117,587
PLASTIC VALVE UNIT
Allan H. Willinger, New Rochelle, N.Y., assignor to Aquariums Incorporated, Maywood, N.J., a corporation of Delaware
Filed May 19, 1960, Ser. No. 30,308
2 Claims. (Cl. 137—315)

This invention relates to a convertible valve assembly, and more particularly to a valve assembly adapted to be interposed in aquarium air lines for the regulation and control of the flow and distribution of air to an aquarium or its associated apparatus.

It is an object of this invention to provide a valve assembly which may be formed of injection-moulded thermoplastic material from a limited number of parts and which may be readily assembled and disassembled without the use of any tools or similar apparatus.

It is also an object of this invention to provide a valve assembly of the character indicated which may be manufactured economically upon a large scale and which effectively controls the flow and distribution of air or similar gases and which is susceptible of rapid assembly by inexperienced personnel.

It is another object of this invention to provide a valve assembly of the character indicated, which is capable of functioning in an efficient manner in spite of comparatively wide manufacturing tolerances and wherein the parts may be readily interchanged as desired.

It is also an object of this invention to provide a valve assembly of the character indicated which may be adapted for a wide range of applications with relatively minor variations in the structure and which is capable of being utilized under the wide range of circumstances encountered in aquarium practice.

In is a further object of this invention to provide a valve of the character indicated which is capable of functioning as a needle valve for flow control and which may be readily converted to a check valve or combination check valve and rate of flow control valve.

Other and further objects, benefits and advantages of this invention will become apparent from the description thereof contained in the annexed drawings, specifications and claims or will otherwise become obvious.

In the accompanying drawings:

FIGURE 1 is an exploded perspective view showing the elements of a valve assembly in accordance with the present invention;

FIGURE 2 is a perspective view on a somewhat reduced scale of the completed valve assembly shown in FIGURE 1;

FIGURE 3 is a rear elevational view, partly broken away, of the valve assembly shown in FIGURE 2;

FIGURE 4 is a front elevational view of the valve housing element, partly broken away;

FIGURE 5 is a cross-section of FIGURE 2 taken along line 5—5 thereof;

FIGURE 6 is a perspective view of a modified form of housing for the valve assembly in the form of a unitary valve block for supporting a multiplicity of valve elements;

Figure 7:
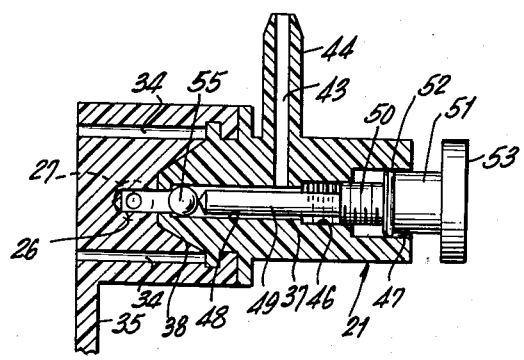
FIGURE 7 is a cross-sectional view showing the elements of the valve assembly when converted for the additional check valve function.

As shown in FIGURE 1, the valve assembly comprising the present invention is formed of a housing member, designated generally by the numeral 20, an intermediate sleeve member designated generally by the numeral 21, which is adapted to be disengagedly associated with the housing 20 and a valve member designated generally by the numeral 22. Each of the members comprising the valve assembly is advantageously formed of a thermoplastic material as by the injection-moulding process permitting economical large-scale production of these members and their subsequent assembly. In the form of the invention illustrated in FIGURE 1, housing 20 is comprised of a generally cylindrical body having a closed end 23 and an open end 24 defined by an inwardly extending frusto-conical recess 25. The frustum of said conical recess 25 is provided with an axial passage 26 which in turn communicates with a continuous transverse passage 27 which extends diametrically of the housing. The housing is further provided with radially extending nozzles 28 and 29 which define ports 30 and 31, communicating with the opposite ends of passage 27 and forming continuations of the transverse passage. The nozzles 28 and 29 are adapted to be received in the ends of hose or tubing connecting the valve housing to a source of air supply or to other similar valves or air utilization devices. The base portion of the wall defining the frusto-conical recess in the housing terminates inwardly of the rim of the housing and defines a generally circumferential ledge 32 spaced inwardly of the housing mouth or rim. A pair of diametrically opposed inwardly projecting lips 33 are formed at the housing rim spaced from the aforesaid ledge 32. As may be seen from FIGURES 3 and 4, said inwardly projecting lips 33 extend chordally across the housing mouth in diametrically opposed position. The lips 33 are formed at the ends of the axially aligned recesses 34 which extend longitudinally of the housing 20 and are disposed in diametrically opposed relation. The recesses 34 permit the introduction of a drop of cement or adhesive so as to permanently join the housing and the sleeve in the event that the take-apart feature is not desired. The joint thus formed is completely invisible. A mounting bracket 35 conveniently provided with an aperture 36 is integrally formed with the housing and permits the valve assembly to be mounted in convenient support in a manner well known to those skilled in the art.

Housing 20 is adapted to disengagedly receive intermediate sleeve 21. Said intermediate sleeve 21 comprises a generally cylindrical body having an axial bore 37 extending therethrough. Axial bore 37 terminates with a reduced opening at the proximal end thereof defined by an inwardly extending flange 45 which forms a valve seat, as will more clearly appear hereafter. The portion of axial bore 37 disposed in the opposing or distal end of the housing is enlarged and threaded, as indicated at 46 and is further enlarged at the mouth end thereof, as indicated at 47. The principal portion 48 of the intermediate sleeve axial bore 37 lies between the valve seat and the threaded enlargement. The forward or proximal end of the intermediate sleeve is provided with a plug portion 38 of frusto-conical conformation complementary to the conformation of the wall of the frusto-conical recess 25 provided within the open end of the housing. Said plug portion 38 terminates in an interrupted locking flange 39 which is comprised of diametrically opposed ears 40 dimensioned to be snugly received in the opening defined by the mouth of the housing. It will be noted that the portions of the flange intermediate the ears are flattened or interrupted so as to clear the lips 33 of the housing and permit the ear portions of the locking flange to abut with and seat upon the ledge 32. The intermediate sleeve is further provided with an enlargement comprising a circumferential collar, which is axially spaced from the locking flange 39, so that when said locking flange abuts with and seats upon ledge 32 within the housing, the forward or proximal face of the collar 41 abuts with and seats upon the rim 42 of the housing.

The intermediate sleeve 21 is further provided with a radially extending port 43 normally used as an exit port. Said port 43 communicates with the axial bore 37 thereof and passes through the nozzle formation 44, permitting the attachment of a hose or tubing to the exit port of the intermediate sleeve. It will be apparent from the foregoing that the proximal or plug end of the intermediate sleeve is thus adapted to be inserted into the frusto-conical recess provided in the housing to the extent that the plug walls abut with and seat upon the complementary walls of the housing recess. The locking flange ears simultaneously abut with and seat upon the ledge 32, as does the collar with respect to the rim 42. It will also be apparent that when the housing and intermediate sleeve are thus associated, the relative rotation of these elements through a 90° angle, as from point A to point B, will cause the ears 40 of the locking flange to be disposed behind the lips 33, thereby securely and sealingly locking the housing and intermediate sleeve to each other in operative relation. The housing and intermediate sleeve may thereafter be readily disengaged by 90° relative rotation.

Control of the valving function of the instant valve assembly is accomplished by means of valve member 22. Said valve member comprises a valve stem 49, which is of somewhat smaller cross-sectional dimension than the principal portion 48 of the bore 37, so as to provide a clearance space therebetween for the flow of air, gas or other fluids. The valve stem 49 extends from the shank of the valve member, which comprises an enlarged threaded portion 50, which is adapted to engage with the complementary threaded portion 46 of axial bore 37. The shank of the valve member 22 is further enlarged as indicated at 51 and is of a complementary conformation to the enlarged portion 47 of axial bore 37. An O ring 52 is mounted about portion 51 of the shank and sealingly engages the enlarged axial bore portion 47 of the sleeve. The wall of bore portion 47 is smooth so that when the valve member is in position within the intermediate sleeve, the seal is effectively maintained during rotary and axial movement of the valve member. The shank of the valve member 22 terminates in an enlarged operating head 53 by means of which the valve member is rotated for advancing and retracting movement. The forward or proximal end of the valve stem is provided with a valve element 54, which, in this case, consists of a conical conformation at the end thereof. The valve element 54 cooperates with the complementary valve seat 45 formed by the inwardly extending flange at the proximal end of the bore 37.

It will be apparent from the foregoing that the assembly of the members 20, 21 and 22 can be readily accomplished manually without the use of tools. The assembly of the housing 20 with the intermediate sleeve merely requiring insertion and rotation through a 90° angle and the assembly of the intermediate housing with the valve member merely requiring insertion and sufficient rotation to accomplish their threaded engagement, in order to complete the assembly. With the parts thus assembled, the valving function is accomplished by the cooperative action of the valve seat and valve element. With the valve member fully advanced into the bore of the intermediate sleeve, the valve element 54 seats upon the valve seat 45 and complete shut-off of air flow between the nozzles 28 and 29 on the one hand and nozzle 44 on the other, is accomplished. As the valve member is gradually retracted, the opening between the valve seat and the valve element is progressively enlarged, permitting a corresponding increase in air flow. The valve may thus be adjusted to any rate of air flow desired and determines the volume of air available at the exit nozzle. Although nozzle 44 is primarily an exit nozzle, it will be understood that the arrangement lends itself to the reversal of nozzle function. When nozzle 44 is utilized as an exit port, the air supply may be coupled to either nozzle 28 or 29. With one of said nozzles coupled to the air supply, the other will provide a port through which the air supply may be further coupled to similar valves or utilization devices. When, on the other hand, nozzle 44 is utilized as an inlet port and the source of air supply is directly coupled thereto, then air will exit through nozzles 28 and 29 under the control of the valve member and in accordance with the setting thereof. If desired, either one of nozzles 28 or 29 may be entirely eliminated.

Figure 8:
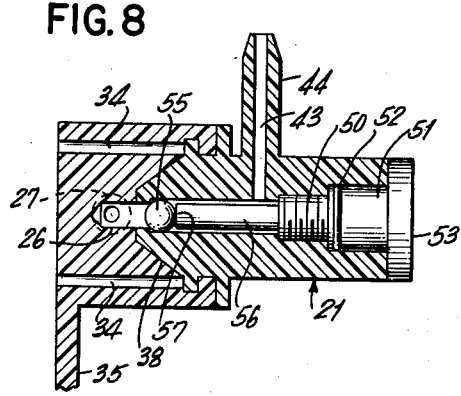
FIGURE 8 is a cross-sectional view of the valve assembly with a modified form of valve stem for check valve use.

FIGURE 7 illustrates the elements of the valve assembly when converted for the check valve function. In this form of the valve, the structure heretofore described is utilized. The check valve function is accomplished by the insertion of a spherical element or ball 55 in the axial bore portion 48 between the valve seat 45 and the valve element 54. The ball 55 is free floating and is advantageously of the same diameter as valve stem 49. It will be noted that the conversion to check valve operation is accomplished by merely removing the valve member 22, inserting the ball into the axial bore and replacing the valve member. With this form of operation, when the valve member is advanced to its extreme position to the left in FIGURE 7, the ball will be seated in the valve seat and complete cut-off of air flow will be accomplished. As the valve member is retracted, the space between the ball and valve seat will be enlarged permitting increased air flow. In this position, the higher air pressure on the inlet or valve seat side of the ball will maintain the ball against the tip of the valve stem. However, if for any reason the pressure on the inlet side of the ball should drop below that existing at the outlet or exit port side, the ball will immediately be forced against the valve seat and check the reverse flow of air or fluid. Such reverse flow conditions are encountered in aquarium practice and the check valve function is important to prevent damage to air pumps or related apparatus. The ability to convert from one form of valve to the combined function, as well as the high efficiency of the valving arrangement in either form contributes significantly to the utility and convenience of the device. FIGURE 8 illustrates a form of the invention utilizing the flow control and check valve feature without the conversion feature. In this form of valve, the structure is in all respects similar to that heretofore outlined with the exception that the valve stem now designated by the numeral 56 is provided with a planar end face 57 instead of the conical operating head 54. The use of a planar end face for the valve stem provides for a more precise control of the position of ball 55 with respect to the valve seat and consequently accurate and uniform control of the air flow.

FIGURE 6 illustrates a modified form of housing for the valve assembly. The modified form of housing comprises a substantially rectangular block designated generally by the numeral 58 and is provided with a series of recesses 59. The block is advantageously injection-moulded in a manner similar to housing 20. The recesses 59 are in all respects similar to the conformation of the rim and interior of housing 20. Consequently, each of said recesses is adapted to receive an intermediate sleeve 21 and an associated valve member. A longitudinally extending bore 60 is provided in said block which interconnects the axial passages 26 in a manner corresponding to the transverse passage 27 of the sleeve 21 illustrated in FIGURES 1 and 4. It will be apparent from the foregoing that, as a consequence of this arrangement, air supplied to nozzle 61 will pass into bore 60 of the block and be distributed to each of recesses 59 within which an intermediate sleeve 21 and valve member 22 is disposed so as to control the flow of air through nozzle 44 of said intermediate sleeve. The block may be provided with any number of recesses 59 and consequently will be adapted to receive any desired number of intermediate sleeves and the valve members disposed therein. The intermediate sleeves are mounted within the block in a manner similar to that heretofore described with respect to the use of individual housing elements 20 and may be removed therefrom as desired. Furthermore, if it is not desired to utilize all of the recesses for valving purposes, any one or more of the recesses may be blocked off as by insertion of a cap 62. Cap 62 is provided with a locking flange structure 63 similar to the interrupted locking flange portion 39 of block portion 38 and with an operating head 64 axially spaced therefrom and corresponding to the circumferential collar 41 on intermediate sleeve 21. Consequently, when cap 62 is inserted into a recess 59 and rotated through an angle of 90°, the cap will be locked over the recess and prevent the escape of air therethrough. It will be apparent that by providing the housing in block form, that a multiplicity of recesses corresponding to the housing recesses, it is possible to feed a number of air lines from a single source and to control the flow into each of said air lines in accordance with the requirements thereof. Furthermore, the block may be utilized with any number of valve sleeves and undesired recesses may be blocked off. This arrangement, therefore, provides for a high degree of flexibility and is highly compact.

While I have here shown and described a preferred embodiment of my invention, it will be apparent however that this invention is not limited to this embodiment and that many changes, additions and modifications can be made in connection therewith without departing from the spirit and scope of the invention as herein disclosed and hereinafter claimed. Having described my invention what I claim as new and desire to secure by Letters Patent is:

1. A valve assembly comprising a housing, an intermediate valve sleeve disengageably associated with the housing and a valve member disengageably associated with said intermediate sleeve, said housing comprising a generally cylindrical body having a closed end and an open end provided with a frusto-conical recess, the frustum of said recess being provided with an axial passage in communication with a transverse passage provided in said housing and extending to opposing wall portions thereof, said transverse passage having opposite ends at the respective opposing wall portions of said housing, a pair of radially extending nozzles carried by said housing in communication with said passage at the respective ends thereof, said recess terminating inwardly of the rim of the housing open end, a ledge spaced inwardly of the housing rim, a pair of diametrically opposed inwardly projecting lips formed along said rim spaced from said ledge, said intermediate valve sleeve comprising a generally cylindrical body having an axial bore extending therethrough and a radially extending port extending through the wall of said sleeve, a flange formed at one end of said sleeve extending inwardly of said axial bore thereby forming a reduced opening therefor and defining a valve seat in the interior of said sleeve, said end of said sleeve being provided with a plug portion of frusto-conical conformation complementary to the conformation of the recess in said housing, a locking flange formed on said sleeve at the juncture of said plug portion with the sleeve body, said flange comprising diametrically opposed ears and intermediate flattened portions, and a circumferential flange formed on said sleeve and axially spaced from said locking flange for abutment with said rim, said locking flange seating upon said ledge when the sleeve is associated with said housing, said ears being disposed in locking engagement with said lips upon relative rotation between said housing and sleeve to thereby secure said sleeve in position in said housing, said sleeve being provided with a radially extending port in communication with the axial bore and extending through the sleeve wall at a point remote from said plug portion, said valve member comprising a valve stem portion of smaller cross-sectional dimensions than the bore to thereby provide a clearance space therebetween and a shank having a threaded portion for engagement with the threaded portion of the bore, an operating head provided on said shank for manually rotating said valve member, the other end of said valve stem being of conical conformation and comprising a valve element seating upon said inwardly directed flange when said valve member is advanced into the axial bore of said housing and defining a progressively enlarged passage space with said seat as said valve member is progressively retracted.

2. A valve assembly comprising a housing, an intermediate valve sleeve carried by said housing and a valve member carried by said sleeve, said housing and sleeve being formed of a thermoplastic material, one end of said housing being provided with a recess for the reception of a portion of said sleeve, axially aligned passages extending from the other end of said housing to a surface of said sleeve disposed in said housing recess, said axially aligned passages being spaced from said valve member whereby an adhesive material may be introduced into said housing and into contact with portions of the housing and sleeve material in order to form an adhesive bond therebetween without interfering with the operation of said valve member.

References Cited in the file of this patent

UNITED STATES PATENTS

| | | |
|---|---|---|
| 675,665 | McCanna | June 4, 1901 |
| 712,929 | Hedstrom | Nov. 4, 1902 |
| 1,082,007 | Brush | Dec. 23, 1913 |
| 1,525,775 | Floyd | Feb. 10, 1925 |
| 1,677,794 | Mueller | July 17, 1928 |
| 1,937,666 | Olson | Dec. 5, 1933 |
| 2,531,479 | Southern | Nov. 28, 1950 |
| 2,598,961 | Andrus | June 3, 1952 |
| 2,617,171 | Kimmel | Nov. 11, 1952 |
| 2,642,262 | Johnson | June 16, 1953 |
| 2,652,069 | Goheen | Sept. 15, 1953 |
| 2,661,019 | Snyder | Dec. 1, 1953 |